United States Patent Office 3,473,153
Patented Oct. 14, 1969

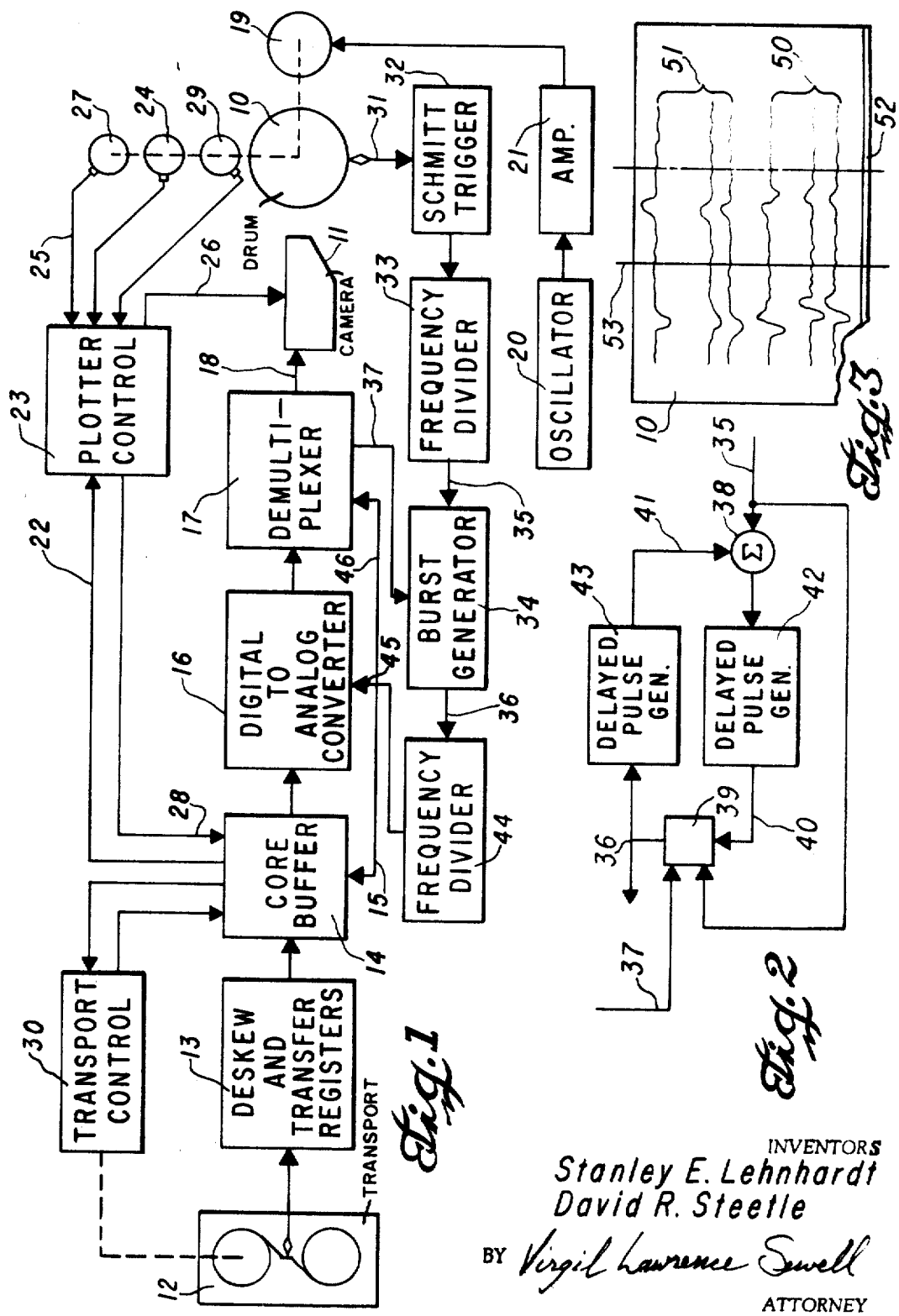

3,473,153
APPARATUS AND METHOD FOR DIGITAL TO ANALOG CONVERSION
Stanley E. Lehnhardt, Dallas, and David R. Steetle, Houston, Tex., assignors to Texas Instruments Incorporated, Dallas, Tex., a corporation of Delaware
Filed June 2, 1966, Ser. No. 554,782
Int. Cl. G11b *13/00*
U.S. Cl. 340—172.5        9 Claims

ABSTRACT OF THE DISCLOSURE

An analog record of electrical digital signals generated by a storage device is provided by temporarily storing the electrical digital signals and releasing said digital signals in response to the occurrence of a read signal. Thereafter, the released electrical digital signals are converted to electrical analog signals which are recorded on a moving recording medium. Read signals are generated in response to the position of said moving recording medium to control the recording of the analog signals in accordance with the position of said moving recording medium.

---

According to one aspect of the invention there is provided a method of and system for processing electrical digital signals from a magnetic tape transport, which signals are representative of the electrical analog signals derived from seismometers during seismic exploration. In the processing, the digital signals are converted back to analog signals, and a film record is made of the analog signals. The film for the analog record is mounted on a rotating drum, with individual seismometer traces being recorded around the cylindrical surface of the drum. Groups of traces corresponding to successive seismic shots are sequentially recorded, one beside the other on the film. If some seismic event recorded for one seismic shot is recorded digitally at a certain elapsed time on the magnetic tape, it is desirable that the analog record of such event be placed on the film record in alignment with the record of those events from other shots which correspond to the same digitally recorded elapsed time. To prevent variations in the speed of the digital tape transport and of the drum carrying the film record from affecting such alignment, the film record of the seismic events is placed on the drum at a precise location. This is accomplished by placing the output signals from the magnetic tape transport in a buffer storage device and causing the buffer to release the digital data therein to a digital-to-analog converter in response to position reference signals magnetically recorded around the drum.

Accordingly, it is an object of the invention to provide an analog record of digital electrical signals derived from a storage device, the proper placement of the analog record being independent of variations in the rate at which the digital signals are derived from the storage device.

Still another object of the invention is to provide plural analog records of digital electrical signals derived from a storage device, using a moving analog recording apparatus and securing the proper alignment of the plural analog records despite variations in the movement of the analog recording apparatus and in the rate at which the digital signals are derived from the storage means.

It is a further object of the invention to convert electrical digital signals derived from a storage means to electrical analog signals in a manner independent of variations in the rate at which the digital signals are derived from the storage means.

Other objects, features and advantages of the invention will be more readily understood from the following detailed description when read in conjunction with the appended claims and attached drawing, in which:

FIGURE 1 illustrates an electro-mechanical system according to the invention, capable of performing the method of the invention.

FIGURE 2 is a diagram of the burst generator in the system of FIGURE 1.

FIGURE 3 illustrates an analog record produced in accordance with the invention.

Referring now to the drawing, there will be described the construction and operation of an apparatus according to the invention. In the system of FIGURE 1, a film is wrapped around the cylindrical surface of a rotating drum 10. Seismic record plotter camera 11 is mounted in relation to drum 10 so as to expose the film thereon to the camera. Camera 11 contains, for example, 24 galvanometrically actuated mirrors, each arranged to vary the incidence of a light beam upon said film in response to an electrical signal applied to the galvanometer. In FIGURE 3, traces 50 represent a group of twenty-four photographically recorded by camera 11. The seismic data to be photographically recorded on the film is derived from magnetic tape transport 12 where the data is recorded on tape in digital form. Thus, it is the purpose of the system shown in FIGURE 1 to accurately photographically plot the digital data stored in transport 12 in analog form on the film of drum 10.

The data to be recorded in analog form on the film of drum 10 is stored by transport 12 in the following manner. On the transport tape are recorded numerous digital words. Each digital word represents the magnitude of one of the electrical analog signals which is to be applied to camera 11 at a certain instant. All the digital bits forming any one of the digital words are stored at one location along the length of the magnetic tape, the bits being recorded one after another across the width of the tape. All of the words representing analog signals to be applied to camera 11 at the same time are arranged in a group, one after another along a small segment of the length of the tape. Between each of such groups of words there is recorded a timing word representative of the time after the shot at which the corresponding analog seismometer signals were recorded. Since camera 11 has 24 input channels, it is necessary for each of the groups or "blocks" of words between the timing words to contain recording space for at least 24 words. However, the blocks may be made to have space for more than 24 words for the purposes of conforming to a standardized tape format. The tape of transport 12 will be considered to have space for 31 words per block, conforming to the standard TIAC format. In addition to the foregoing, each word on the tape has an extra binary bit which is not representative of an analog magnitude, but is used as a clock bit. The clock bit, which is always a binary "1," serves to mark the location of the word on the tape for timing and synchronization purposes.

As the tape in transport 12 moves, all of the bits across the width of the tape which are under the playback head at any instant, are read from the tape and transferred as a group to deskew and transfer registers 13. Ideally, all the bits read by transport 12 from the tape at any given instant would be from one digital data time, as they are stored on the tape. However, at times the tape is actually skew with respect to the playback head, and the bits read from the tape will be from more than one data time. Registers 13 form a common digital systems component for dealing with this problem. Registers 13 temporarily store the information transmitted thereto from transport 12, detect the effects of skew on the information, and re-arrange the bits to place them in the grouping which would appear at the output of transport 12 in the absence of skew. Thus, the input to core buffer 14 is the sequence of digital words stored along the length of the tape, buffer 14 receiving all of the bits of each word at one time. An example of such deskew and transfer registers are those of the 9000 Digital Office System seismic data processing system manufactured by Texas Instruments Incorporated.

Core buffer 14 is another conventional digital component. Its construction and operation are as follows. At the input of the buffer 14 is an input register (not shown) having enough bit capacity to store the digital word which has just been transferred to buffer 14 from registers 13. The buffer stores the digital words as they are received in its input register in a systematic, sequential fashion in a core memory. Meanwhile, the output section of the buffer (not shown) transfers the oldest word stored in the core to an output register. At the receipt of a read pulse at input 15, the bits of the word in the output register are transferred in parallel, that is simultaneously, to digital-to-analog converters 16. An example of a core buffer such as buffer 14 is the model MB1024X20-5-R sold by Fabri-Tek, Inc., Amery, Wis.

Digital-to-analog converter 16 is of the conventional type for producing an analog voltage at the output thereof corresponding to the number represented by the bits of the digital word at the input thereof. Due to the sequence of digital words being applied to the input of converter 16, its output is a sequence of corresponding analog voltage levels. Since each word on the tape of digital transport 12 represents a signal to be applied to a different galvanometric input channel of camera 11, each analog voltage in the sequence at the output of converter 16 is likewise to be applied to a different one of the camera channels. The distribution of the analog voltages to the twenty-four channels of camera 11 is performed by demultiplexer 17, which contains standard circuitry for sequentially connecting the signal at the input thereof to each of a plurality of output channels. Thus, each time a digital-to-analog conversion is completed by converter 16, demultiplexer 17 connects the analog voltage to a new one of the twenty-four input channels to camera 11. The plural output channels of the demultiplexer are represented by one signal flow path 18 in FIGURE 1. It is apparent that the switching between channels causes an input to be applied to any one channel only during a periodically occurring interval. Accordingly, each channel of the demultiplexer has a filter of the sort normally provided in such digital-to-analog conversion and demultiplex systems for smoothing the signal in that channel so that the signal applied to each of the inputs of camera 11 is a smooth analog waveform rather than a pulse train amplitude modulated by the analog waveform.

The film to be exposed by camera 11 is preferably a rectangular film wrapped around the cylindrical surface of drum 10 so as to nearly totally cover that surface. The drum 10 and camera 11 are so aligned that the light spots from camera 11 at any given instant lie in a line parallel to the cylindrical axis of drum 10. Drum 10 is rotated by a synchronous motor 19. The driving signal for motor 19 derives from oscillator 20 and is applied to the motor by power amplifier 21.

The mechanical operation of the system in FIGURE 1 is controlled in the following manner. At the initiation of operation, transport 12 is manually switched into operation. When one digital word has been stored in buffer 14, the buffer applies a ready pulse to input 22 of plotter control 23. Position pulses from drum 10 are generated by conventional position indicator discs 24, 27 and 29. Disc 24, mounted coaxially with drum 10 for rotation therewith has a pin hole near one edge thereof. A fixed light source (not shown) is located on one side of the disc. The source and sensor are so positioned that the pin hole moves between them just before the film on drum 10 is to move in front of camera 11. When the pin hole moves between source and sensor, the sensor produces an electrical output pulse which is applied to input 25 of plotter control 23. The coincidence of this position pulse and the ready pulse from the buffer causes plotter control 23 to generate a signal at output 26 to open the shutter of camera 11. The circuitry of control 23 corresponding to this function is given below. Disc 27 is arranged to produce a second position pulse when the film moves in front of camera 11, causing plotter control 23 to produce a signal on output 28 which allows buffer 14 to transfer data to converter 16 whenever read pulses are received by the buffer at input 15 from frequency divider 44. At the end of the film disc 29 causes a pulse to be applied to plotter control 23 to close the shutter of camera 11. If the end of the digital record occurs before the end of the film on drum 10, a signal recorded on the tape of transport 12 actuates plotter control 23, causing the shutter to close. Also in response to the signal which closes the shutter, there is actuated a motor driven worm gear (not shown) to displace camera 11 axially along drum 10 so that the camera will be in position to begin another record beside the first. After the axial displacement of camera 11, the occurrence of the position pulse from disc 24 along with the ready pulse from buffer 14 start the plotting of the new record. The second record, which will commonly be composed of the traces from a second seismic shot, are placed side by side running along the film to form a second recording channel, as traces 51 are placed beside traces 50 in FIGURE 3.

Plotter control 23 is a combination of switching circuits which may be designed in several ways by one skilled in the art to perform the above-described functions. For example, the pulse generated by disc 24 may be appropriately shaped and applied to an AND circuit in control 23 along with the ready pulse from buffer 28, so that the coincidence of both pulses will cause a third pulse to switch on the shutter apparatus of camera 11, as by actuating a bistable circuit. The ready pulse from buffer 28 may be generated by connecting the elements of the buffer output register to an OR circuit, so that the presence of a bit in any element of the register generates a ready pulse. The pulse from disc 27 may be connected to cause a bistable circuit to change state and thereby permit read outs from buffer 28, as by properly connecting an output of the bistable circuit to an AND circuit along with the read pulses from divider 44. The pulse from disc 29 will also be applied to the bistable circuit to change its state back and disable the readout from buffer 28. The pulse from disc 29 is further applied to close the shutter of camera 11, as by returning the previously described bistable circuit associated with the shutter switch to its original state. The pulse from disc 29 also actuates a time delay relay, counter circuit, or other means to switch on for a predetermined period the motor for axially displacing camera 11. The signal which maintains the displacing motor turned on may be applied to an inverter and then ANDed with the outputs of discs 27 and 24, to inhibit the pulses from said discs during the axial displacement of the camera 11. To shut off the camera at the end of the tape on transport 12, a digital code word may be recorded at the end of the tape. A digital comparator responsive to the buffer output register and to an auxiliary register containing the code word, produces an output pulse at the appearance of the code word from the tape to close the shutter of camera 11.

When transport 12 is generating digital signals applied to registers 13, it is being driven at such a rate with respect to converter 16, that words are transferred into the buffer at a rate approximately 10% greater than they are transferred out. Transport control 30 monitors the output and input registers of buffer 14 to maintain the proper amount of data stored therein. When the words in the output and input registers indicate that the buffer is within thirty-two words of being full, transport control 30 inhibits the transfer of additional data to the buffer and signals the transport 12 to stop and move in reverse motion into position for renewed transfer of words to registers 13. When the words in the output and input registers of the buffer indicate that the buffer is within two hundred fifty-six words of being empty, the transport is started forward again, and the buffer is enabled to receive the next word on the tape after the word last received. The control operations may be implemented by digitally subtracting or otherwise comparing the core address of the digital word ready to be read out of the buffer and that of the last word read in to the buffer to determine the number of words in the buffer. The determined number is compared with the preset limits of thirty-two (from being full) and two hundred fifty-six (from being empty), and a reverse command is applied to transport 12 if the one limit is detected, and a forward command if the other is detected. The operation and construction of control 30 are of the type employed in the transport recycle control available with the TIAC computer, manufactured by Texas Instruments Incorporated. In this manner, the buffer always contains data words ready to be read out, but no words are missed.

Drum 10 has a length of magnetic recording tape 52, shown in FIGURE 3, running completely around the cylindrical surface thereof near one end of the drum. Prior to the plotting operation of the system, a one kilocycle sinusoidal waveform is recorded on the magnetic tape as the drum is rotated at the speed at which plotting is to be performed. Then during the plotting, a playback head 31 reads the one kilocycle signal and applies it to the input of a Schmitt trigger circuit 32. The Schmitt trigger 32, in characteristic fashion, produces a pulse train of one kilocycle pulse repetition frequency in response to the sinusoidal input. The one kilocycle pulse train is applied to the input of frequency divider 33. Frequency divider 33 is of the conventional complementary flip-flop type, and can be set to produce at the output thereof a pulse train having one-half or one-fourth of the one kilocycle input rate, or the output frequency of divider 33 may be made the same as the input rate. Burst generator 34, which receives at its input 35 the pulse train from divider 33, is shown in greater detail in FIGURE 2.

The application of an input pulse from frequency divider 33 to burst generator 34 initiates a 40 kilocycle pulse train, which appears at output 36. FIGURE 2 illustrates how such a pulse train is generated. An incoming pulse from frequency divider 33 is applied to burst generator 34 in two places, at summing junction 38 and gate circuit 39. The application of the pulse to gate circuit 39 merely opens the gate to connect output 40 to output 36. Gate circuit 39 is a bistable circuit which then stays open until a pulse is received on the other input 37, as described below. The signal on input 35 is applied to summing junction 38 and thence to the input of delayed pulse generator 42. Delayed pulse generators 42 and 43 are each a conventional circuit for producing in response to an input pulse an output pulse occurring a fixed time delay after the input pulse. Thus, each of the generators represents a fixed time delay element in the apparatus of FIGURE 2. At the occurrence of the pulse on input 35, there is no signal on output 41; therefore, the input to generator 42 is the one pulse from frequency divider 33. After the time delay, generator 42 produces an output pulse at output 40, which pulse is applied by output 36 both to frequency divider 44 of FIGURE 1 and to the input of delayed pulse generator 43. After another time delay, generator 43 produces at output 41, a pulse which is applied to the input of generator 42 by means of summing junction 38 which applies thereto any signal on either input 35 or output 41. After yet another time delay, generator 42 produces another output pulse, which, as before, is applied to both frequency divider 44 and generator 43. It is in this manner that the application of a sole input pulse at input 35 initiates the generation at output 36 of a pulse train having a fixed pulse repetition frequency. It is apparent that the period between the pulses generated at output 36 is determined by the sum of the two time delays interposed by generators 42 and 43. For a 40 kilocycle pulse repetition frequency, the period of the pulse train should be 25 microseconds. It is desired that the pulse train at output 36 terminate after the application of thirty-two pulses to buffer 14, one for each of the 31 data channels and one for timing purposes. This is obtained by deriving a signal from demultiplexer output 37 each time the demultiplexer finishes switching through all the channels. Such a signal may be obtained by generating a pulse when the last multiplex switch in the sequence of channels closes. The signal on output 37 closes gate circuit 39 to terminate the pulse train at output 36.

Frequency divider 44, receiving the output of burst generator 34 may be the same circuit as divider 33. In the operation of the system of FIGURE 1, divider 44 always produces the same amount of frequency division from its input to its output as does frequency divider 33.

At the application of each pulse from frequency divider 44 to input 15 of buffer 14, the word stored in the output register of buffer 28 is applied to digital-to-analog converter 16, which begins its digital-to-analog conversion. Then a new word is transferred into the output register of the buffer. Thus, it is the purpose of the pulses generated by frequency divider 44 to determine the time at which digital data is converted to analog form, demultiplexed and applied to the appropriate channel of camera 11. The inputs 45 and 46 serve to synchronize the operations of converter 16 and demultiplexer 17 with the read operation initiated by input 15 in buffer 14.

In the operation of the system of FIGURE 1, the first step is to set the speed of motor 19 and hence, of drum 10. The rotational speed of drum 10 is chosen in accordance with the extent to which the events to be recorded on the tape thereon are to be stretched out along the length of the record. A slower speed of drum 10 causes two seismic events on the same channel to be physically spaced closer together on the film record. The speed of motor 19 may be rendered selectable merely by employing a multi-speed, synchronous motor. Additional speed control may be provided by employing a variable frequency divider between the output of oscillator 20 and the input of amplifier 21.

After the speed of the drum has been selected, a one kilocycle sine wave is recorded on the magnetic tape encircling drum 10 by any suitable means not shown. Then frequency dividers 33 and 44 are set to divide by one, two, or four, depending upon whether the data stored by transport 12 was recorded at a 1, 2, or 4 millisecond sampling rate. If a one millisecond sampling rate was used in recording, the recording apparatus sequentially sampled each of the 31 input channels every millisecond and recorded the sampled information on the tape. Hence, to record on the film around drum 10 the information contained on the tape at the rate the information was originally recorded on the tape, buffer 14 must discharge a block of 31 words to converter 16 each millisecond. It is the purpose of the circuit having its output at input 15 to provide for readout from buffer 14 at substantially one, two, and four millisecond intervals. For, as previously described, at each cycle of the sine wave recorded across the film on drum 10, a pulse is applied to frequency divider 33 and then to burst generator 34. Since the period of a one kilocycle signal is one millisecond, frequency divider 33 has applied thereto a sequence of pulses separated by approximately one millisecond, depending upon variations resulting from variations in the rotational speed of drum 10. If frequency dividers 33 and 44 are set to divide by one, corresponding to a one millisecond sampling rate, burst generator 34 also receives pulses one millisecond apart. In response to each received pulse, burst generator 34 produces a burst of thirty-one pulses, which are 25 microseconds apart. These thirty-one pulses are applied by divider 44 to input 15 of buffer 14 and cause thirty-one digital words to be transferred to converter 16 each millisecond. If dividers 33 and 44 are set to divide by two, the pulses at input 35 of burst generator 34 are two milliseconds apart, and those at the output of divider 44 are 50 microseconds apart, causing thirty-one words to be transferred from the buffer to converter 16 every two milliseconds. As previously described, the thirty-one pulses are also applied at inputs 45 and 46 as synchronization pulses required by the synchronous conversion and demultiplexing performed by converter 16 and demultiplexer 17, respectively.

As set forth above, the system of FIGURE 1 records traces 50 from a first seismic shot and traces 51 side by side as shown in FIGURE 3. In a system such as that of FIGURE 1, for sequentially recording analog traces one beside the other, it is desirable that an event in the first group of traces and an event in the second group of traces which are plotted at the same distance along the elapsed time axis of the film record actually be events which correspond to the same amount of time elapsed from the seismic shot. Thus, those events in traces 50 of FIGURE 3 which lie on line 53 should represent signals recorded the same number of seconds after the shot as the events in traces 51 lying on line 53. There are two sources of error which can cause events in side by side recordings not to represent the same record time. The first of these sources of errors is the variation with time of the speed of the tape transport. Such variation causes the readout rate of the digital words from the tape to vary at times from the sampling rate. That is, if the sampling rate is one millisecond some of the blocks of digital words read from transport 12 may be produced at a rate slightly less or greater than one each millisecond. If data were merely recorded on drum 10 as it came off the tape, it would exhibit slight misalignments on the surface of the drum film corresponding to such inaccuracies in the readout rate. The variations in transport speed do not precisely repeat themselves; therefore, if a second set of seismic traces were recorded on drum 10 beside a first, the variations in the placement of the data in the second traces on the film would not correspond, except accidentally, to the variations in the placement of the data for the first traces. Therefore, events side by side on the drum would often not correspond to the same record time, as is desirable.

The second source of error is the variation with time of the rotational speed of drum 10. Again, if data were merely recorded on drum 10 as it came off the tape, the drum variations would introduce errors in the placement of the data along the length of the traces, just as would the transport speed variation. Again, the drum speed variations do not exactly recur so that the traces of a second record would experience errors in placement which were different from those experienced by the first record.

In the system of FIGURE 1, the data is not recorded merely at the rate it comes from transport 12 and at whatever location on drum 10 happens to be present at that time. Instead, the analog information corresponding to each digital word coming from transport 12 has associated therewith a particular location on drum 10 at which location it is recorded. The association of the information with a particular drum location is accomplished by the recorded timing signal on drum 10. Each time the drum reaches a position in which the recorded sine wave causes a pulse to be produced by Schmitt trigger 32, generator 34 applies a burst of read pulses to buffer 14, causing a block of digital words to be converted to analog form and recorded on drum 10. This recording process is independent of the variations encountered in the speed of transport 12. Moreover, whatever variations may arise in the rotational speed of drum 10, when a second set of seismic traces is recorded thereon and the drum rotates to such a position that the pulse is applied to generator 34, a block of digital data is converted and recorded at that drum position. Since the number of cycles of the recorded sine wave between the beginning of the seismic records and any point along the records does not change, the number of digital data blocks converted and recorded in that interval will be the same for the first and second sets of traces. The data blocks are recorded on the tape of transport 12 at the same sampling interval for all sets of traces; therefore, any point along the record on drum 10 represents the same record time for all sets of traces.

Even where it is desirable to record only one set of traces on drum 10, the system of FIGURE 1 offers an advantage. It removes as a source of error in the analog recording operation, the speed variation of transport 12. As explained above, the seismic data is recorded on drum 10 in accordance with a particular location of the drum, and not in dependence on the rate at which digital information comes from transport 12. In similar fashion, a variation of the system in FIGURE 1 may be employed in digital-to-analog conversion applications without a recording drum to remove transport speed variations as a source of error. In such an arrangement, a crystal controlled oscillator could generate the input pulses to frequency divider 33 to provide precise unloading of buffer 14. If the output of demultiplexer 17 were, for example, to be temporarily displayed on a cathode ray oscilloscope, the use of the oscillator controlled buffer read signals would prevent display errors arising from variations in the speed of transport 12.

It is to be understood that the above described embodiment is merely illustrative of the application of the principles of the invention. Numerous other arrangements may be devised by those skilled in the art without departing from the spirit and scope of the invention as defined by the appended claims.

What is claimed is:

1. Apparatus for producing from a record of electrical digital signals a record of corresponding analog signals, comprising:
   first storage means for generating electrical digital signals representative of said digital record,
   buffer storage means responsive to said first storage means to store said electrical digital signals and release said digital signals in response to a read signal applied thereto,
   means responsive to said buffer storage means for converting the electrical digital signals released by said buffer storage means to electrical analog signals,
   second storage means including a moving recording means for making a record of said electrical analog signals, and
   means for applying read signals to said buffer storage means in response to the position of said moving recording means, thereby to control the recording of the analog signals in accordance with the position of said moving recording means.

2. Apparatus as set forth in claim 1, wherein said second storage means further includes means for adding to said record of said electrical analog signals a second record of electrical analog signals running beside the first record along the direction of motion of said moving recording means.

3. Apparatus for converting electrical digital signals generated at a rate having undesired fluctuations by a storage device to electrical analog signals and making a record of said analog signals, comprising:
   buffer storage means responsive to said storage device for storing said electrical digital signals and releasing said digital signals in response to a read signal applied thereto,
   means responsive to said buffer storage means to convert the electrical digital signals released by said buffer storage means to electrical analog signals, second storage means including a moving recording means for making a record of said electrical analog signals, and means for applying read signals to said buffer storage means in response to the position of said moving recording means, thereby to control the recording of the analog signals in accordance with the position of said moving recording means.

4. Apparatus as set forth in claim 3, wherein said second storage means further includes means for adding to said record of said electrical analog signals a second record of electrical analog signals running beside the first record along the direction of motion of said moving recording means.

5. Apparatus as set forth in claim 3, wherein said means for applying read signals includes a magnetic recording medium moving with said moving recording means and having a recording thereon for initiating said read signals.

6. Apparatus for producing electrical analog signals representative of a digital record, comprising:
first storage means for generating electrical digital signals representative of said digital record at a rate exhibiting undesired fluctuations, buffer storage means responsive to said first storage means to store said electrical digital signals and releasing said digital signals in response to a read signal applied thereto, means responsive to said buffer storage means to convert the electrical digital signals released by said buffer storage means to electrical analog signals, and means for applying read signals to said buffer storage means at preselected times, thereby to prevent said analog signals from being affected by variations in the rate at which said first storage means produces said electrical digital signals.

7. Apparatus for making a record of an analog signal from electrical digital signals generated by a magnetic tape storage device comprising:
buffer storage means responsive to said magnetic tape storage device for storing said electrical digital signals and releasing said digital signals in response to a read signal applied to said buffer storage means, means responsive to said buffer storage means to convert the electrical digital signals released by said buffer storage means to electrical analog signals, camera means including a moving film for making a record of said electrical analog signals on one of plural recording channels running side by side along the direction of motion of said film, magnetic tape means moving with said film and having a periodic position reference signal recorded thereon, and means actuated by said periodic position reference signal to apply read signals to said buffer storage means, thereby to control the recording of the analog signals in accordance with the position of said film.

8. The method of making an analog record of electrical digital signals generated by a storage device, comprising:
temporarily storing said electrical digital signals and releasing said digital signals in response to the occurrence of a read signal, converting the released electrical digital signals to electrical analog signals, recording said electrical analog signals on a moving recording medium, and generating read signals in response to the position of said moving recording medium, thereby to control the recording of the analog signals in accordance with the position of said moving recording medium.

9. The method of claim 8, including the step of adding to said record of said electrical analog signals, a second record of electrical analog signals running beside the first record along the direction of motion of said moving recording medium.

References Cited

UNITED STATES PATENTS

| 3,333,247 | 7/1967 | Hadley et al. | 340—172.5 |
| 3,345,608 | 10/1967 | Brown et al. | 340—15.5 |
| 3,380,020 | 4/1968 | Clark | 340—15.5 |

RAULFE B. ZACHE, Primary Examiner

U.S. Cl. X.R.

340—15.5; 346—33